United States Patent
Breitgand et al.

(10) Patent No.: US 8,732,310 B2
(45) Date of Patent: May 20, 2014

(54) POLICY-DRIVEN CAPACITY MANAGEMENT IN RESOURCE PROVISIONING ENVIRONMENTS

(75) Inventors: David Breitgand, Modiin (IL); Benny Rochwerger, Zichron Yaakov (IL); Julian Satran, Atlit (IL)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 12/764,987

(22) Filed: Apr. 22, 2010

(65) Prior Publication Data

US 2011/0264805 A1 Oct. 27, 2011

(51) Int. Cl.
*G06F 15/173* (2006.01)
*G06F 9/455* (2006.01)

(52) U.S. Cl.
USPC .............. 709/226; 709/224; 709/225; 718/1; 370/229

(58) Field of Classification Search
USPC ......................... 709/224–226; 718/1; 370/229
See application file for complete search history.

(56) References Cited

U.S. PATENT DOCUMENTS

| | | | |
|---|---|---|---|
| 6,990,666 B2 * | 1/2006 | Hirschfeld et al. | 718/104 |
| 7,536,373 B2 * | 5/2009 | Kelkar et al. | 706/52 |
| 7,668,703 B1 * | 2/2010 | Rolia et al. | 703/2 |
| 8,103,486 B1 * | 1/2012 | Rolia et al. | 703/2 |
| 8,239,526 B2 * | 8/2012 | Simpson et al. | 709/224 |
| 8,250,582 B2 * | 8/2012 | Agarwala et al. | 718/104 |
| 8,291,411 B2 * | 10/2012 | Beaty et al. | 718/1 |
| 8,332,859 B2 * | 12/2012 | Boss et al. | 718/104 |
| 8,402,140 B2 * | 3/2013 | Zhang et al. | 709/226 |
| 8,458,334 B2 * | 6/2013 | Sukthankar et al. | 709/226 |
| 2002/0152305 A1 * | 10/2002 | Jackson et al. | 709/224 |
| 2005/0256759 A1 * | 11/2005 | Acharya et al. | 705/10 |
| 2007/0043860 A1 * | 2/2007 | Pabari | 709/224 |
| 2008/0059972 A1 * | 3/2008 | Ding et al. | 718/105 |
| 2008/0151766 A1 * | 6/2008 | Khasnabish et al. | 370/252 |
| 2008/0295096 A1 * | 11/2008 | Beaty et al. | 718/1 |
| 2008/0301024 A1 * | 12/2008 | Boss et al. | 705/37 |
| 2009/0216883 A1 * | 8/2009 | Fellenstein et al. | 709/224 |
| 2010/0125665 A1 * | 5/2010 | Simpson et al. | 709/224 |
| 2010/0131324 A1 * | 5/2010 | Ferris | 705/8 |
| 2011/0116376 A1 * | 5/2011 | Pacella et al. | 370/235 |
| 2011/0125894 A1 * | 5/2011 | Anderson et al. | 709/224 |

(Continued)

OTHER PUBLICATIONS

Wikipedia, Probility, Feb. 12, 2013 pp. 1-9.*

(Continued)

*Primary Examiner* — Backhean Tiv
(74) *Attorney, Agent, or Firm* — F. Jason Far-hadian, Esq.; Century IP Group

(57) ABSTRACT

Systems and methods for policy-driven capacity management in a resource provisioning environment, the method comprising storing, in an operational database one or more virtual resource sets (VRSs) and elasticity ranges for components to be deployed in a resource provisioning environment, and probabilistic guarantees on the elasticity ranges defined in a service manifest provided by a service subscriber; collecting historical data about capacity usage in the resource provisioning environment and failure statistics from the operational database, in addition to prior service commitments due to previously contracted service level agreements (SLAs) stored in a SLA repository; calculating equivalent capacity for the resource provisioning environment based on a defined residual benefit goal, and other business goals instrumented by way of a policy engine; and placing requested virtual resources on physical resources, in response to determining that sufficient physical capacity is available to host the calculated equivalent capacity.

18 Claims, 6 Drawing Sheets

(56) References Cited

U.S. PATENT DOCUMENTS

| | | | |
|---|---|---|---|
| 2011/0125895 A1* | 5/2011 | Anderson et al. | 709/224 |
| 2011/0126275 A1* | 5/2011 | Anderson et al. | 726/8 |
| 2011/0173329 A1* | 7/2011 | Zhang et al. | 709/226 |
| 2011/0264805 A1* | 10/2011 | Breitgand et al. | 709/226 |
| 2011/0307901 A1* | 12/2011 | Blanding et al. | 718/104 |
| 2012/0250681 A1* | 10/2012 | Khasnabish et al. | 370/389 |
| 2012/0271678 A1* | 10/2012 | Agarwala et al. | 705/7.27 |
| 2012/0303400 A1* | 11/2012 | Boss et al. | 705/7.12 |
| 2012/0303805 A1* | 11/2012 | Simpson et al. | 709/224 |
| 2013/0007272 A1* | 1/2013 | Breitgand et al. | 709/224 |
| 2013/0019011 A1* | 1/2013 | Breitgand et al. | 709/224 |
| 2013/0024567 A1* | 1/2013 | Roxburgh et al. | 709/224 |

OTHER PUBLICATIONS

Wikipedia, Vector(Mathematics and Physics), Feb. 12, 2013 pp. 1-4.*

Wikipedia, Set(Mathematics), Feb. 12, 2013 pp. 1-9.*

Wikipedia, Normal Distribution, Feb. 12, 2013 pp. 1-37.*

Roch A. Guerin et al, "Equivalent Capacity and its Application to Bandwidth Allocation in High-Speed Networks", IEEE Journal on Selected Areas in Communications, vol. 9, Issue 7, Sep. 1991, pp. 968-981.

Ronald P. Doyle et al. (IBM Research Triangle Park), "Model-Based Resource Provisioning in a Web Service Utility", USENIX Symposium on Internet Technologies and Systems (USITS), 2003.

Ludmila Cherkasova et al. (Hewlett-Packard Labs, USA) "An SLA-Oriented Capacity Planning Tool for Streaming Media Services", In Proceedings of IEEE International Conference on Dependable Systems (DSN'04), 2004. URL: http://www2.computer.org/portal/web/csdl/doi/10.1109/DSN.2004.1311945.

Yuan Chen et al., "A Systematic and Practical Approach to Generating Policies from Service Level Objectives", Hewlett-Packard Labs, USA., IM 2009, NY 2009.

Jerry Rolia et al, "A Capacity Management Service for Resource Pools", WOSP 2005, URL: http://portal.acm.org/citation.cfm?id=1071047.

Abhishek Chandra (Univ. of Massachusetts Amherst), Pawan Goyal (IBM Almaden Reserach Center), and Prashant Shenoy (Univ. of Massachusetts Amherst), "Quantifying the Benefits of Resource Multiplexing in On-Demand Data Centers", 2003. URL: http://lass.cs.umass.edu/~abhishek/papers/self-man.

Anthony Sulistio et al., "Managing Cancellations and No-shows of Reservations with Overbooking to Increase Resource Revenue", CCGRID, Proceedings of the 2008 Eighth IEEE International Symposium on Cluster Computing and the Grid, pp. 267-276, Year of Publication: 2008, ISBN:978-0-7695-3156-4.

Georg Birkenheuer et al., "The Gain of Overbooking", Proceedings of the 14th Workshops on Job Scheduling Strategies for Parallel Processing (JSSPP), May 2009.

Bhuvan Urgaonkar et al. , "Resource Overbooking and Application Profiling in Shared Hosting Platforms", ACM SIGOPS Operating Systems Review, vol. 36 , Issue SI (Winter 2002). OSDI '02: Proceedings of the 5th symposium on Operating systems design and implementation, Special Issue: Cluster resource management, pp. 239-254, Year of Publication: 2002 ISSN:0163-5980.

* cited by examiner

POLICY-DRIVEN CAPACITY MANAGEMENT IN RESOURCE PROVISIONING ENVIRONMENTS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to a scheme for using historical analysis of the allocated capacity to different resources in a virtual system to manage future allocation of capacity for the resources.

BACKGROUND

Infrastructure services or infrastructure as a service (IaaS) delivers computer infrastructure as a service, typically in a platform virtualization environment. Service subscribers and clients, rather than purchasing servers, software, data center space or network equipment, instead buy those resources as a fully outsourced service. The service is typically billed on a utility computing basis. The amount of resources consumed and therefore the costs are based on the level of subscriber activity.

In general, a server layer is configured to include computer hardware or computer software products that are specifically designed for the delivery of services to a particular subscriber. The services may include access to multi-core processors, cloud-specific operating systems and additional computing services. Some IaaS provisioning platforms provide resources for information technology communication (ITC) where availability of resources is guaranteed according to service level agreements (SLAs).

One embodiment of the IaaS paradigm is an infrastructure computing cloud (ICC). In an ICC, the subscribers purchase ITC resources in the form of virtual machines (VMs), virtual storage, and virtual networks. The subscribers are charged according to a pay-as-you-go model. The subscribers may purchase ITC resources from an ICC provider by a single subscriber in the framework of a single SLA as virtual resources set (VRS). With ICC, cloud subscribers are offered capacity on demand to match variations in workload. Accordingly, the number of VM instances in VRS may dynamically change.

To explicitly set contractual obligations on availability of resources, ICC subscribers may specify the range of resources of every type that is needed. That is, a subscriber may designate the maximum or minimum number of VM instances of every type of service that it may want to reserve. The values that set the reserved range for each resource are referred to as capacity ranges. Availability SLA for VMs within each range is specified by way of one or more availability service level objective (SLO) clauses.

ICC providers strive to maintain a minimal capacity that is sufficient to guarantee the VRSs' SLA commitments subject to the acceptable risk level of non-compliance due to congestion, as controlled by the ICC provider's business policy. The minimal capacity is the equivalent capacity that is defined for each type of resource, based on the number of instances of the resource that is needed to support all the resource demand of services with the particular level of congestion as a function of the acceptable risk level.

The equivalent capacity may be presented as a vector of resource, where for each type of resource, it is indicated how many instances of resources are available to satisfy the calculated risk level. It is desirable to manage the resources based on a projected demand so that the overall demand is less than the equivalent capacity expressed in terms of virtualized resources. In other words, it is desirable to maintain an equivalent capacity that is less than the actual physical capacity of the resource taking into consideration a safety margin.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for policy-driven capacity management in a resource provisioning environment is provided. The method comprises storing, in an operational database one or more virtual resource sets (VRSs) and elasticity ranges for components to be deployed in a resource provisioning environment, and probabilistic guarantees on the elasticity ranges defined in a service manifest provided by a service subscriber; collecting historical data about capacity usage in the resource provisioning environment and failure statistics from the operational database, in addition to prior service commitments due to previously contracted service level agreements (SLAs) stored in a SLA repository; calculating equivalent capacity for the resource provisioning environment based on a defined residual benefit goal, and other business goals instrumented by way of a policy engine; and placing requested virtual resources on physical resources, in response to determining that sufficient physical capacity is available to host the calculated equivalent capacity.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
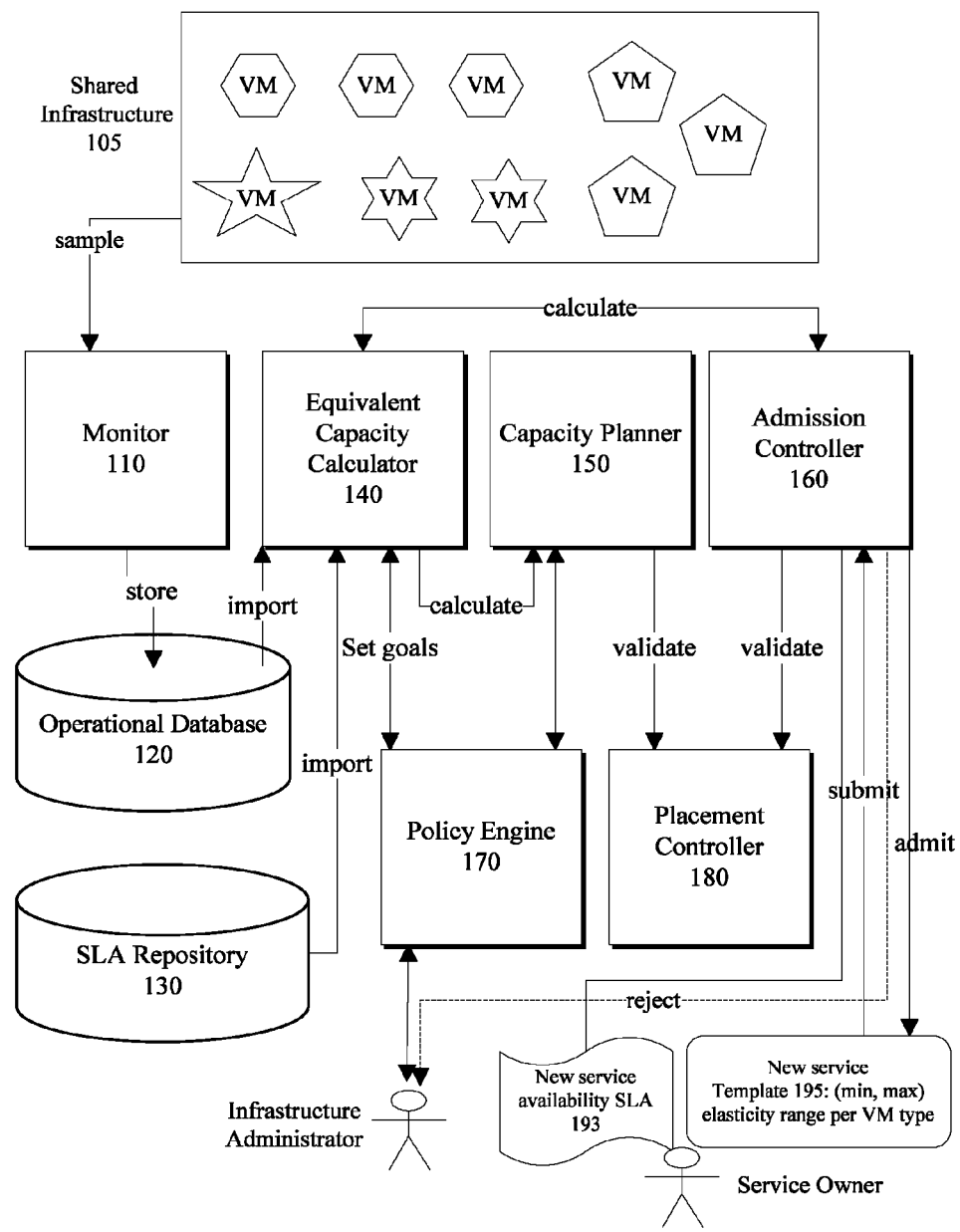
FIG. 1 illustrates an exemplary operating environment in accordance with one or more embodiments.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, the allocation of virtual resources may be managed based on service level agreements (SLAs) that define the quality of service (QoS) for the resources in a way to optimize the throughput of the system and support multiplexing of resources without resulting in congestion. Within the context of this disclosure, throughput optimization refers to maximizing system yield with minimal congestion, where congestion is defined as significantly over-allocating the available physical resources to the point that QoS cannot be guaranteed.

Equivalent capacity in this context refers to the minimum allocated capacity sufficient to guarantee QoS commitments subject to the acceptable risk level of non-compliance due to congestion, such that equivalent capacity is as close to physical capacity as possible. In accordance with one embodiment, a service subscriber may designate the maximum or minimum number of VM instances of the type of services that the subscriber would like to reserve probabilistically, i.e., with the required level of success probability. The values that set the reserved range for each resource are referred to as capacity ranges. The availability of SLA for VMs within each range is specified by way of one or more availability service level objective (SLO) clauses.

The SLOs, in one exemplary embodiment, are generated in the following form: "With probability P, capacity range R=[Min, Max] for virtual resource R of type X will be guaranteed throughout the usage window W with probability P computed over SLA evaluation period E." Each virtual resource or VM is characterized based on its virtual central processing units (CPUs), memory, virtual disks or virtual network interfaces. Similarly virtual network and disks are characterized by minimal and maximal available bandwidth and minimal and maximal volumes, respectively. Other attributes of virtual resources may be considered as well.

In one embodiment, a subscriber is responsible for determining the needed level of service. The subscriber's capacity demands reflect the actual needs of the service to guarantee end-user QoS under different circumstances (e.g., different workload levels, different hours, etc). Thus, by guaranteeing availability of the requested capacity ranges (i.e., by guaranteeing the elasticity demands of a service), the infrastructure provider also protects the application-level QoS of the service.

SLAs specify financial penalties for SLA non-compliance. To avoid SLA non-compliance which may lead to significant financial repercussions for the service provider, a service provider plans the ICC capacity in such a way as to maximize the infrastructure yield on the one hand, and minimize the SLA non-compliance effect on the other hand. In one embodiment, to avoid SLA non-compliance the service provider may over-provision capacity. However, extensive over-provisioning is costly and may off-set the benefits of maximizing SLA compliance. Therefore, in another embodiment, yield maximization and risk of non-compliance are traded against each other.

In one implementation, due to variability in workloads imposed by different subscribers, the service provider's capacity is multiplexed among a plurality of subscribers. Multiplexing capacity reduces over-provisioning, but increases probability of non-compliance. Optionally, an elastic VRS may be guaranteed to be able to grow to its maximal size as contracted by the VRS SLA. However, if the available physical capacity is excessively multiplexed, the service provider may not be able to meet the guarantee if congestion occurs (i.e., if too many VRSs try to grow simultaneously and exceed the physical capacity of the provider).

It is noteworthy that each service provider may have its own acceptable risk level (ARL) with respect to SLA non-compliance due to congestion. These differences stem from the possibly different business goals pursued by different service providers. A service provider may define the ARL, capacity management and admission control policies using a computer implemented policy engine. If the available physical capacity is smaller than the equivalent capacity, SLAs may not be guaranteed at the ARL level. Conversely, if available physical capacity is greater than the equivalent capacity and feasible placement of the virtual resources belonging to the VRSs exists for an equivalent capacity for resource ranges defined for a usage windows, then availability SLAs of all VRSs are protected at all times with probability=1−ARL, where ARL is the acceptable risk level probability.

FIGS. 1 through 4B are provided to illustrate systems and methods that may be utilized according to one or more embodiments to use historical analysis of the allocated capacity to different resources in a virtual system to manage future allocation of capacity for the resources. Referring to FIG. 1, an exemplary operating environment 100 comprises a monitor 110, an operational database 120, a SLA repository 130, an equivalent capacity calculator 140, a capacity planner 150, an admission controller 160, a policy engine 170, and a placement controller 180. One or more of the above elements may be controlled by an infrastructure administrator, wherein a shared infrastructure 105 having a plurality of VRSs (e.g., VMs) is used to service the requests of a service owner (e.g., a client, a subscriber, etc.).

Monitor 110 monitors operational data about the shared infrastructure 105 and VRSs to collect historical data inputs as provided in further detail below. Operational database 120 is utilized to store the operational data collected by monitor 110. SLA repository 130 stores the SLAs for the VRSs. The SLAs may be used for capacity planning and admission control by capacity planner 150 and admission controller 160. Equivalent capacity calculator 140 calculates equivalent capacity needed to protect SLAs at the 1−ARL level. Capacity planner 150 uses equivalent capacity computed by equivalent capacity calculator 140 to provide recommendations about the allocation of resources to maintain proper physical capacity.

In one implementation, admission controller 160 uses SLA repository 130, operational data 120 and equivalent capacity computed by equivalent capacity calculator 140 to estimate the SLA incompatibility risks, if a new VRS is added to the system. A new VRS may be added if a new service is accepted or if SLA terms of an existing VRS are renegotiated. An optional policy engine 170 may be included to serve as a management tool to set and maintain policies to deal with capacity planning and admission control. A placement controller 180 may be utilized to validate whether a feasible deployment (i.e., placement) of VMs or VRSs is possible, prior to actual allocation or deployment of resources.

In the exemplary operating environment 100, a risk level policy may be set by the infrastructure administrator and a new service request may be submitted to admission controller 160. Admission controller 160 may alert a human controller (e.g., the infrastructure administrator) if level of risk is not acceptable. The human controller may authorize system rejection or increase system bandwidth and resources or take other action to remedy the situation alerted of. Admission controller 160 may provide the new service request to equivalent capacity calculator 140. Equivalent capacity calculator 140 calculates the equivalent capacity and provides it to capacity planner 150 and placement controller 180 to calculate and validate the equivalent capacity. Placement controller 180 returns the result to admission controller 160 to indicate whether the risk level based on historical data is acceptable.

Figure 2A:
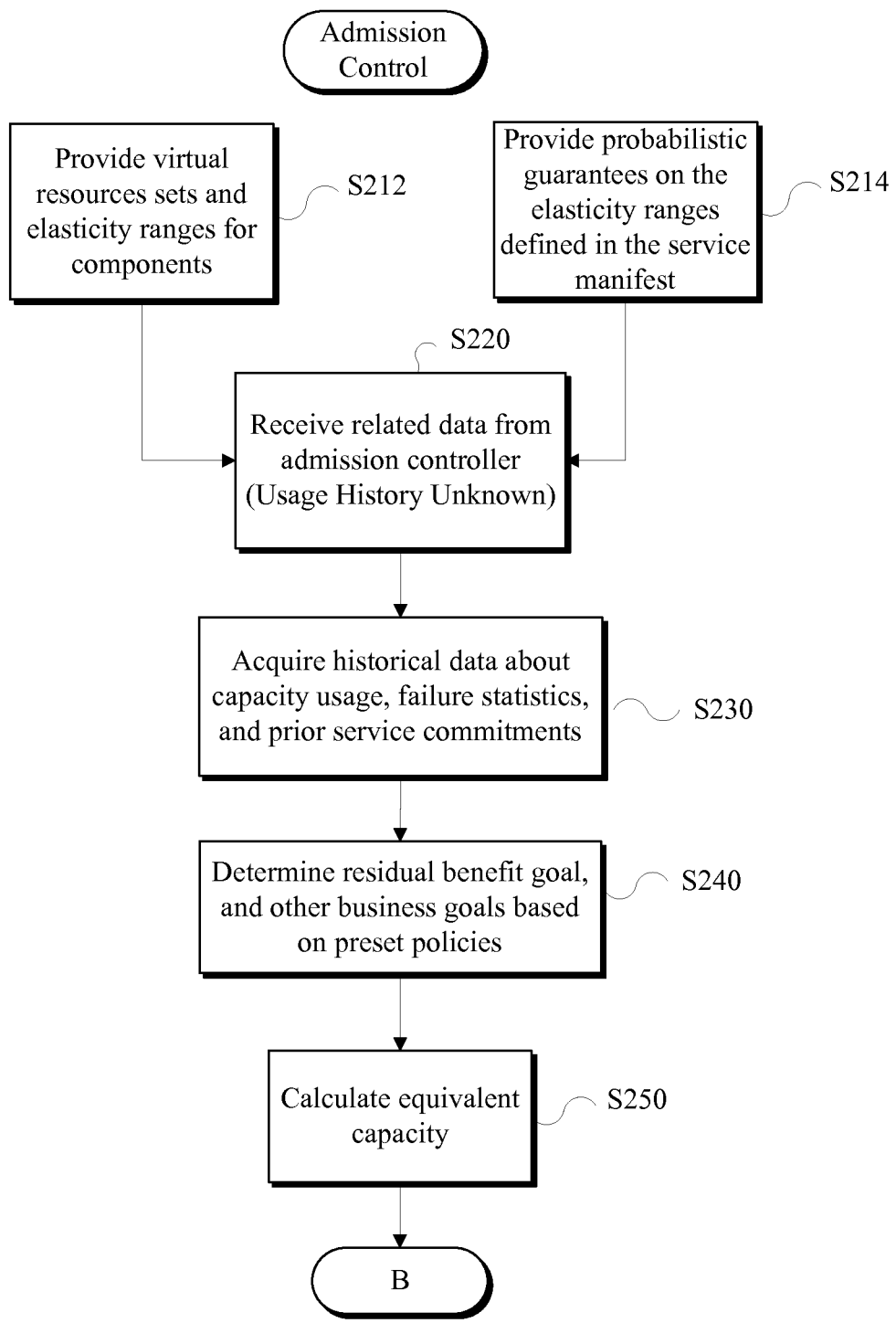
FIGS. 2A, 2B and 3 are flow diagrams of methods for admitting and planning the use of historical data collected based on allocated capacity to different resources to manage future allocation of capacity for the resources in a virtual system, in accordance with one embodiment.
Figure 2B:
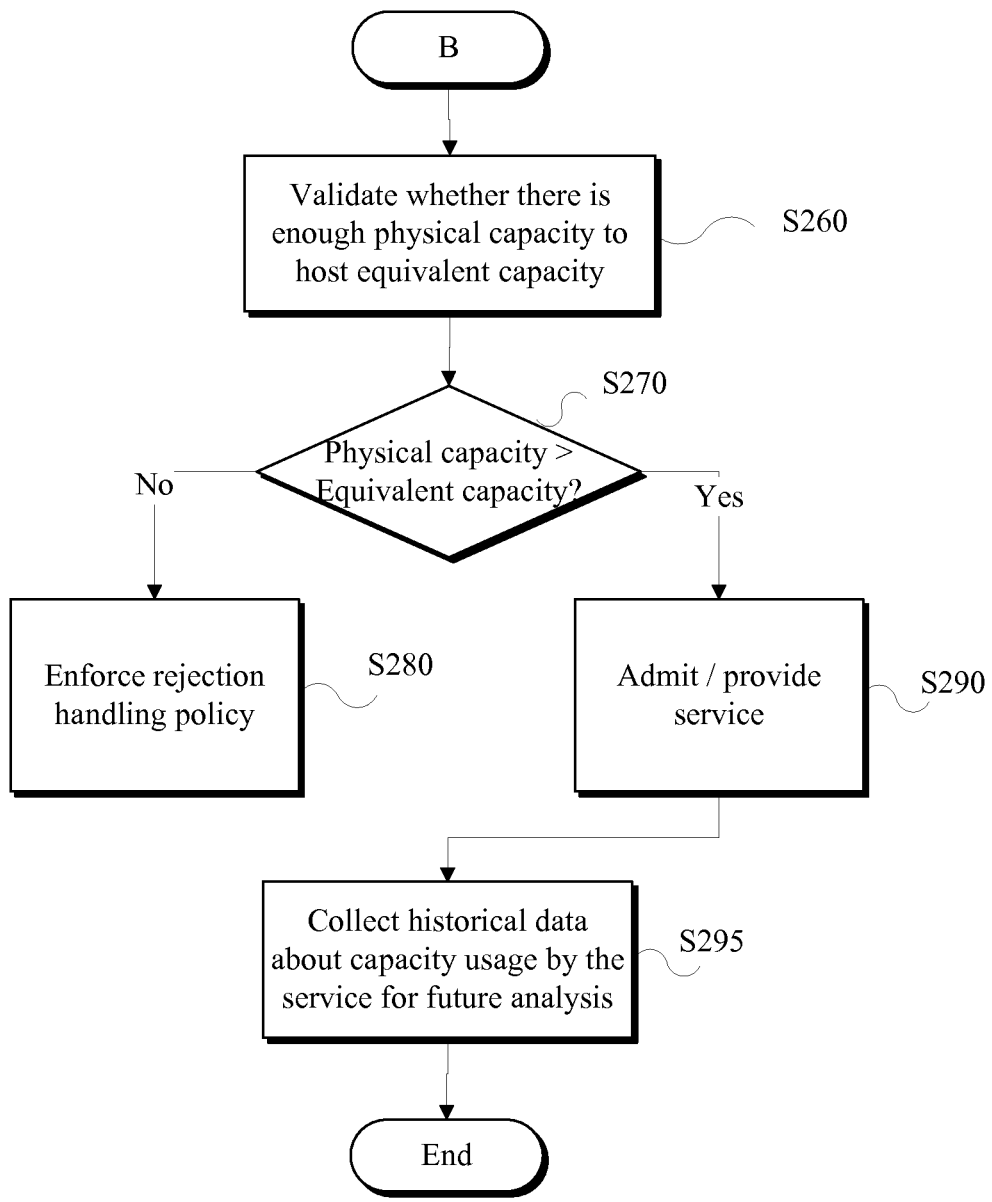

Referring to FIGS. 1, 2A and 2B, the admission control process is discussed in further detail as illustrated in the depicted exemplary flow diagrams in the drawings. According to certain aspects, a service owner may provide a new service availability SLA 193 and new service template 195 in the form of a service manifest (e.g., a structure template) to admission controller 160 to provide VRSs and elasticity ranges for components and the probabilistic guarantees on the elasticity ranges defined in the service manifest (S212, S214). Admission controller 160 may combine the information provided by the service owner. The result of the calculations by the admission controller 160 may be received by the equivalent capacity calculator 140 (S220). In one embodiment, at this stage, usage history for the new service is unknown, and therefore a worst case scenario is assumed for the purpose of calculating equivalent capacity.

Upon invocation, equivalent capacity calculator 140 acquires historical data about capacity usage in the system and failure statistics from the operational database 120, in addition to prior service commitments due to already contracted SLAs from the SLA repository 120 (S230). Equivalent capacity calculator may also receive the ARL, residual benefit goal, and other business goals from the policy engine 170 (S240) to calculate equivalent capacity for the new service (S250). In one embodiment, placement controller 180 is responsible for actual placement of the virtual resources on the physical resources and is utilized to validate whether there is enough physical capacity to host the calculated equivalent capacity (S260, S270). A suitable placement algorithm may be utilized by placement controller 180 in order to realize the validation.

Figure 3:
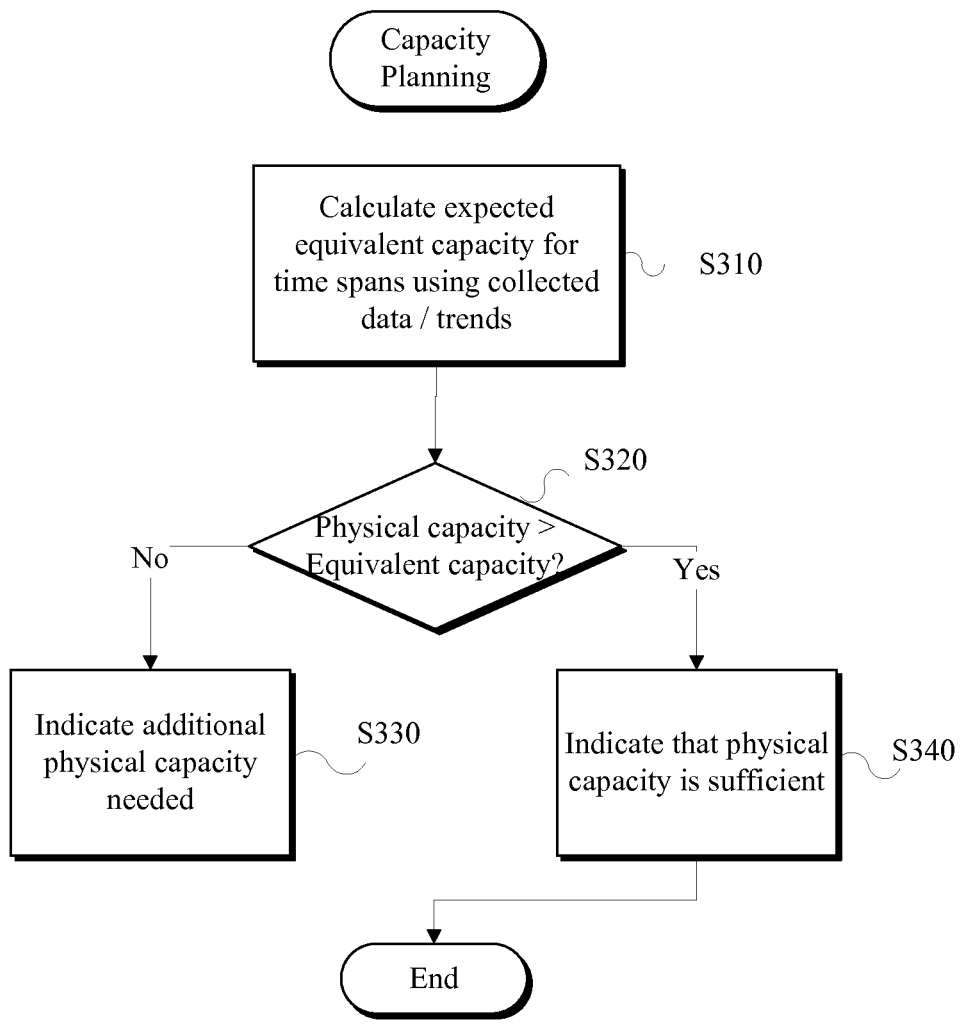

Depending on implementation, if the physical capacity is insufficient to host the calculated equivalent capacity, then a rejection handling policy is enforced (S280). Otherwise, the requested service is admitted or provided (S290). In some embodiments, with passage of time, actual data about capacity usage by the admitted or requested service will be collected and used by equivalent capacity calculator 140 for future capacity planning (S295). Referring to FIG. 3, for example, the capacity planning process in accordance with one embodiment is disclosed in further detail.

As shown in FIG. 3, the equivalent capacity calculator 140 is periodically invoked to calculate expected equivalent capacity for different time frames (i.e., windows) based on data that suggests use trends and other relevant information collected and stored in operational database 120 and SLA repository 130 (S310). If the results indicate that the physical capacity is insufficient to host equivalent capacity the capacity planner 150 is notified that additional physical capacity is needed to cover the calculated equivalent capacity (S320, S330). Otherwise, it is determined that the physical capacity is sufficient to cover the calculated expected capacity (S340).

In one embodiment, a method for equivalent capacity approximation is utilized in the context of the bandwidth capacity planning where the set $(C^1, C^2, \ldots, C^n)_t^v$ represents a vector of random variables. The vector, for example, represents the number of physical machines of each type deployed by a VRS at time instance "t" where the maximal number of VMs of each type that may be deployed by each VRS is bound by a range agreed upon in the corresponding SLO clause of an SLA for the VRS. The probability distribution of these variables will not have a heavy tail and therefore the mean value $M_v^i$ and standard deviation $S_v^i$ exist for each $C^i$.

In one embodiment, shared infrastructure 105 may host multiple VRSs. In this context, it is assumed that the VRSs behave independently and are reasonably well-approximated using Gaussian approximation according to the formula:

$$C^i(ARL) = M^i + S^i * (SQRT(-2 \ln(ARL) - \ln(2PI)),$$

where $M^i = SUM_v M_v^i$ (total mean in standardized capacity units) and $S^i = SUM_v S_v^i$ (total standard deviation).

Accordingly, to maximize overbooking of physical and virtual resources with a controllable level of SLA non-compliance, VRS capacity requirements may be expressed in terms of standard capacity units (SCU) of different types. In one embodiment, the service subscribers may request VMs that mimic physical servers with fixed ratios between memory size, CPU speed, network bandwidth and storage volume. In one embodiment, it may be assumed that a service provider will provide a finite number of VM classes. Hereafter, we refer to such classes as "standard" or "general purpose", "CPU High", "Memory High", "Network High", etc. Further, each VM class may be provided in a number of sizes (e.g. small, medium, large, extra large, etc.). The pair (class, size) may be used to define an instance type, for example.

If a VM of each type constitutes, for example, a standard capacity unit, then capacity requirements of a VRS as a whole may be represented as a vector of pairs $CR = (\{C^1_{min}, C^1_{max}\}, \{C^2_{min}, C^2_{max}\}, \ldots, \{C^n_{min}, C^n_{max}\})$, where $C^j_{min}$ stands for the minimal number of standard capacity units of type j and $C^j_{max}$ stands for the maximal units thereof. A pair $\{C^j_{min}, C^j_{max}\}$ comprises a capacity range for VMs of type j expressed in the standard capacity units for this type. Consequently, an availability SLOs for a VRS may be generalized as follows:

With probability P, capacity range $CR = (\{C^1_{min}, C^1_{max}\}, \{C^2_{min}, C^2_{max}\}, \ldots, \{C^n_{min}, C^n_{max}\})$ of the VRS will be available throughout the usage window W where probability P is computed over SLA evaluation period E".

In one embodiment, multiple SLO clauses for multiple usage windows can be defined for the VRS in the SLA for a VRS. An exemplary capacity optimization method may take as input one or more of the following data:

1. Historic data about capacity requests by each VRS. For each VRS v, the historic data comprises vector data points $(C^1, C^2, \ldots, C^n)_t^v$ for each time instance t at which the sampling of the VRS v occurs. $C^j$ in the vector stands for request for $C^j$ capacity units of type j by VRS v at time t.

2. Historic data about capacity actually granted to each deployed VRS. For each VRS v, the historic data comprises vector data points $(C^1, C^2, \ldots, C^n)_t^v$ for each time instance t at which the sampling of the VRS v occurs. $C^j$ in the vector stands for the momentary usage of $C^j$ capacity units of type j by VRS v at time t.

3. Acceptable risk probability (i.e., the probability of congestion of the IaaS cloud provider). In one embodiment, this probability is defined as $ARL=\max_{slo}\{P\}$. It is noteworthy that if this availability probability is guaranteed, then other less stringent availability requirements are automatically satisfied, where a conservative ARL is set.

In one embodiment, ARL may be set as a weighted sum of P where weights are determined based on the relative importance of VRSs. In another embodiment, ARL may be set based on the business goal for residual benefit of the site. Optionally, statistics for historic failure events (e.g., events related to host crash, network unavailability, etc.) may be also considered in one or more embodiments.

In accordance with one embodiment, an exemplary capacity optimization method may be implemented based on the following processes which were covered in abstract earlier with reference to FIG. 3:

1. Calculate $CAP(ARL)=(C^1(ARL), C^2(ARL), \ldots, C^n(ARL))$ for a given historic time series, where CAP(ARL) is physical capacity expressed in standard capacity units, sufficient to guarantee that congestion (in VM allocation) due to VRS elasticity will occur in the site with probability no greater than ARL.

2. Compare CAP(ARL) to the available physical capacity.
   2.1. If CAP(ARL)>available physical capacity, there is insufficient capacity and it should be expanded at least to CAP(ARL)
   2.2. If CAP(ARL)<available physical capacity go to Step 2.3
   2.3. Due to possible deployment constraints that may cause capacity fragmentation, a system responsible for VM placement algorithm may be consulted to verify that suitable placement exists for the VMs corresponding to different VRSs so that the VMs' needs are supported in spite of possible fragmentation.

It is noteworthy that the information on the number of VMs of each type may be directly available from CAP(ARL) and may be used by the placement algorithm to calculate a placement plan without detailed information on associating VMs with VRSs. If feasible placement exists, it is determined that the system has sufficient capacity. Otherwise, the physical capacity of the site may be increased to the point when such a placement is satisfied.

The admission control process accepts as input historic data noted above (e.g., capacity requests, capacity grants, acceptable risk probability, etc.). In one embodiment, an admission control process that keeps ARL at a desired target level provided capacity may be expressed and planned as provided in further detail below—a similar scheme was covered in abstract earlier with reference to FIGS. 2A and 2B:

A. Receiving a request for admission of a new VRS into the system.
B. Assuming maximal capacity requirements of the mew VRS according to the provided capacity specification (as no historic information is yet available about the VRS), and computing CAP(ARL).
C. Performing process 2.1 noted above. If available physical capacity of the system is smaller than the required equivalent capacity, apply management policy that may:
   C.1 Reject the requested VRS
   C.2 Prompt capacity enhancement for the site
   C.3 Prompt a change in ARL to conduct a more aggressive admission policy
   C.4 Prompt renegotiation of the SLA terms for the new VRS
   C.5 Other possible remedy
D. If in C it is determined that the available physical capacity is larger than the equivalent capacity, perform process 2.3 noted above. If placement (including the maximal demand for the new service exists), admit the service, as its SLA is guaranteed. Otherwise perform process 2.3. Depending on the outcome, either admit the new VRS to the system or perform processes C.1 through C.5 above.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
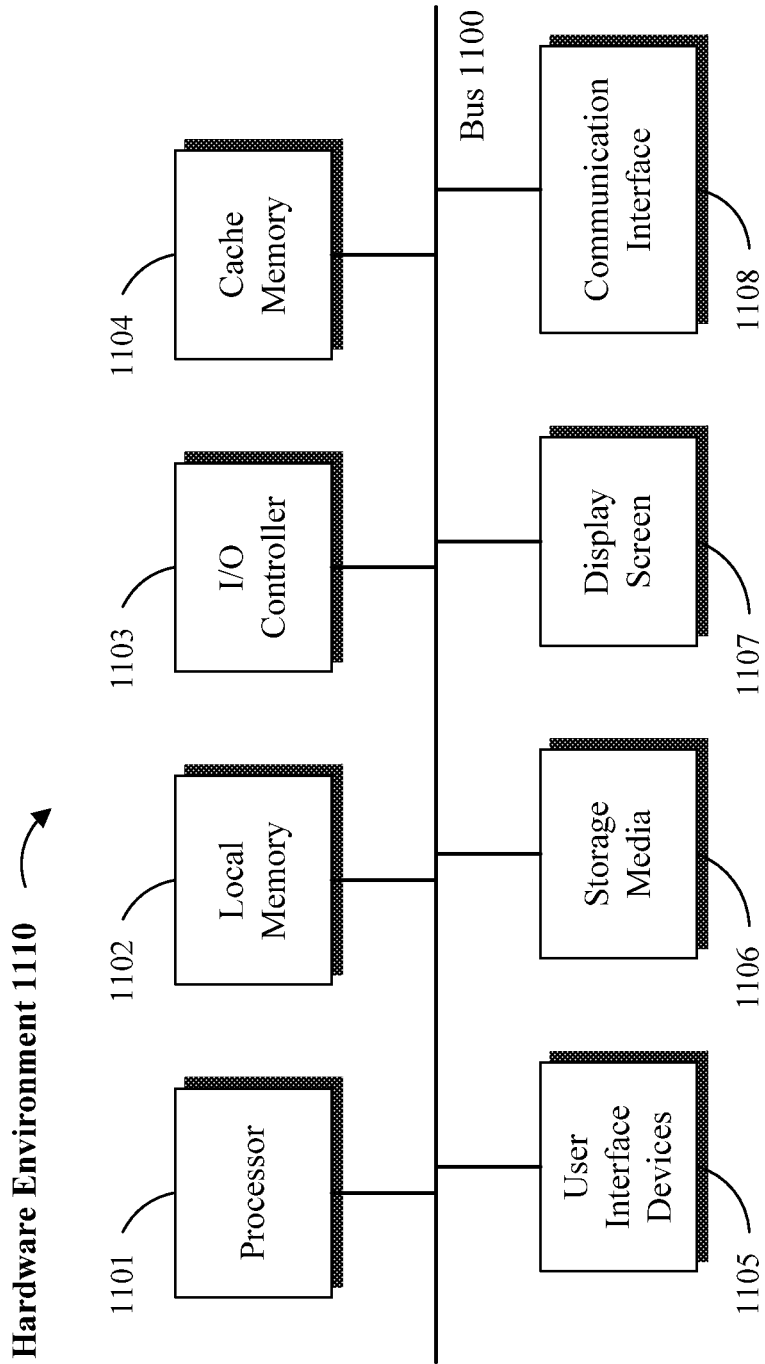
FIGS. 4A and 4B are block diagrams of hardware and software environments in which the disclosed systems and methods may operate, in accordance with one or more embodiments.
Figure 4B:
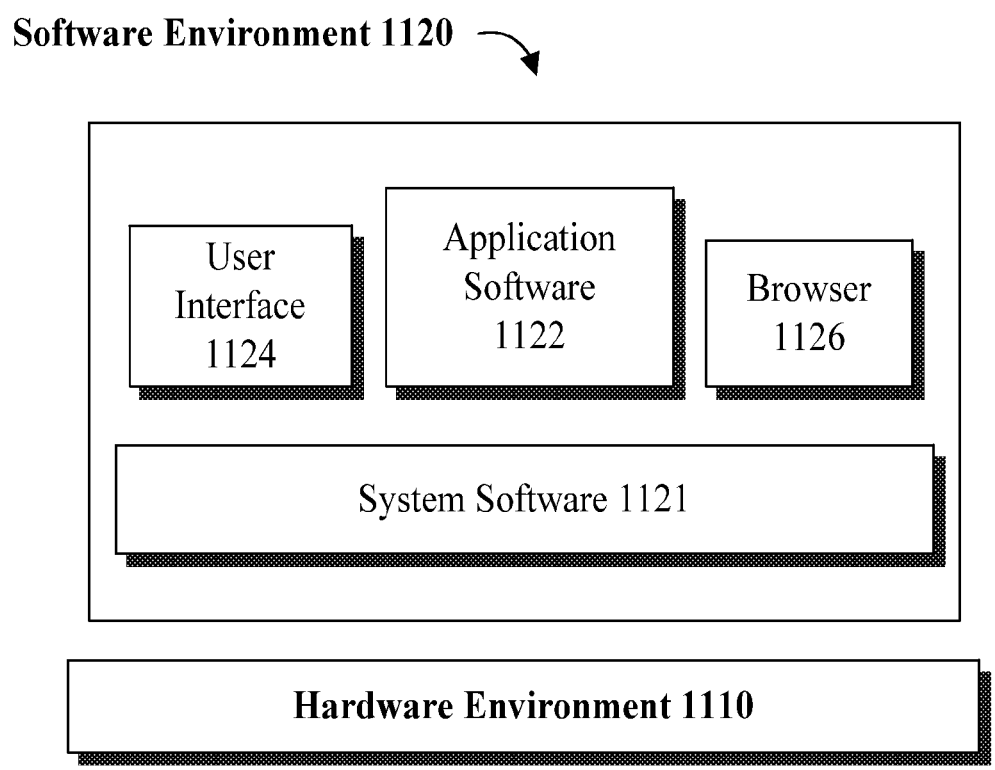

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented system for policy-driven capacity management in a resource provisioning environment, the system comprising:
   an admission controller for storing, in an operational database:
      one or more virtual resource sets (VRSs) and elasticity ranges for components to be deployed in the resource provisioning environment, and
      probabilistic guarantees on the elasticity ranges defined in a service manifest provided by a service subscriber;
   a monitor for collecting historical data about capacity usage in the resource provisioning environment and failure statistics from the operational database, in addition to prior service commitments due to previously contracted service level agreements (SLAs) stored in a SLA repository;
   an equivalent capacity calculator for calculating equivalent capacity for the resource provisioning environment based on a defined residual benefit goal, and other business goals instrumented by way of a policy engine,
   wherein equivalent capacity refers to minimum allocated capacity sufficient to guarantee QoS commitments subject to acceptable risk level of non-compliance due to congestion, such that equivalent capacity is as close to physical capacity as possible; and
   a placement controller for placing requested virtual resources on physical resources, in response to determining that sufficient physical capacity is available to host the calculated equivalent capacity,
   wherein an acceptable risk level (ARL) with respect to SLA non-compliance due to congestion for a service provider is defined by a policy engine such that if the available physical capacity is greater than the equivalent capacity and feasible placement of virtual resources belonging to the VRSs exists for an equivalent capacity for resource ranges defined for a usage windows, then availability SLAs of VRSs are protected at with probability=1−ARL, where ARL is the acceptable risk level probability.

2. The system of claim 1, wherein the admission controller enforces a rejection handling policy, in response to determining that the available physical capacity is insufficient to host the calculated equivalent capacity.

3. The system of claim 1, wherein the admission controller admits a requested service by the service subscriber, in response to determining that sufficient physical capacity is available to host the calculated equivalent capacity.

4. The system of claim 1 further comprising a capacity planning calculator periodically invoked to calculate expected equivalent capacity for different time frames based on data that suggests use trends and other relevant information collected and stored in the operational database and the SLA repository.

5. The system of claim 4, wherein the capacity planning calculator notifies a capacity planner that additional physical capacity is needed to cover the calculated equivalent capacity, in response to determining that the physical capacity is insufficient to host the calculated equivalent capacity.

6. The system of claim 1 wherein equivalent capacity approximation is utilized in context of the bandwidth capacity planning where the set (C1, C2, ..., Cn)tv represents a vector of random variables such that physical machines of each type deployed by a VRS at time instance "t" where the maximal number of VMs of each type that may be deployed by each VRS is bound by a range agreed upon in the corresponding service level objectives (SLO) clause of an SLA for the VRS.

7. The system of claim 6 wherein the VRSs behave independently and are reasonably well-approximated using Gaussian approximation according to the formula: $Ci(ARL)=Mi+ Si*(SQRT(-2\ln(ARL)-\ln(2PI))$, where $Mi=SUMv\ Mvi$ (total mean in standardized capacity units) and $Si=SUMv\ Svi$ (total standard deviation).

8. The system of claim 7 wherein if a VM of each type constitutes a standard capacity unit, then capacity requirements of a VRS as a whole may be represented as a vector of pairs CR=({C1 min,C1max}, {C2 min,C2max}, ..., {Cnmin,Cnmax}), where Cjmin stands for the minimal number of standard capacity units of type j and Cjmax stands for the maximal units thereof and a pair {Cjmin,Cjmax} comprises a capacity range for VMs of type j expressed in the standard capacity units for this type.

9. The system of claim 8 wherein an availability SLOs for a VRS may be generalized as follows:
   with probability P, capacity range CR=({C1 min,C1max}, {C2 min,C2max}, ..., {Cnmin,Cnmax}) of the VRS will be available throughout usage window W where probability P is computed over SLA evaluation period E.

10. A computer program product comprising a non-transitory computer readable storage medium having a computer readable program, wherein the computer readable program when executed on a computer causes the computer to:
    store, in an operational database:
       one or more virtual resource sets (VRSs) and elasticity ranges for components to be deployed in a resource provisioning environment, and
       probabilistic guarantees on the elasticity ranges defined in a service manifest provided by a service subscriber;
    collect historical data about capacity usage in the resource provisioning environment and failure statistics from the operational database, in addition to prior service commitments due to previously contracted service level agreements (SLAs) stored in a SLA repository;
    calculate equivalent capacity for the resource provisioning environment based on a defined residual benefit goal, and other business goals instrumented by way of a policy engine, wherein equivalent capacity refers to minimum allocated capacity sufficient to guarantee QoS commitments subject to acceptable risk level of non-compliance due to congestion, such that equivalent capacity is as close to physical capacity as possible; and
    place requested virtual resources on physical resources, in response to determining that sufficient physical capacity is available to host the calculated equivalent capacity,
    wherein an acceptable risk level (ARL) with respect to SLA non-compliance due to congestion for a service provider is defined by a policy engine such that if the available physical capacity is greater than the equivalent capacity and feasible placement of virtual resources belonging to the VRSs exists for an equivalent capacity for resource ranges defined for a usage windows, then availability SLAs of VRSs are protected at with probability=1−ARL, where ARL is the acceptable risk level probability.

11. The computer program product of claim 10, wherein the computer readable program when executed on a computer further causes the computer to enforce a rejection handling policy, in response to determining that the available physical capacity is insufficient to host the calculated equivalent capacity.

12. The computer program product of claim 10, wherein the computer readable program when executed on a computer further causes the computer to admit a requested service by the service subscriber, in response to determining that sufficient physical capacity is available to host the calculated equivalent capacity.

13. The computer program product of claim 10, wherein an equivalent capacity calculator is periodically invoked to calculate expected equivalent capacity for different time frames based on data that suggests use trends and other relevant information collected and stored in the operational database and the SLA repository.

14. A computer-implemented method for policy-driven capacity management in a resource provisioning environment, the method comprising:
    storing in an operational database:
       one or more virtual resource sets (VRSs) and elasticity ranges for components to be deployed in the resource provisioning environment, and
       probabilistic guarantees on the elasticity ranges defined in a service manifest provided by a service subscriber;
    collecting historical data about capacity usage in the resource provisioning environment and failure statistics from the operational database, in addition to prior service commitments due to previously contracted service level agreements (SLAs) stored in a SLA repository;
    calculating equivalent capacity for the resource provisioning environment based on a defined residual benefit goal, and other business goals instrumented by way of a policy engine,
    wherein equivalent capacity refers to minimum allocated capacity sufficient to guarantee QoS commitments subject to acceptable risk level of non-compliance due to congestion, such that equivalent capacity is as close to physical capacity as possible; and
    placing requested virtual resources on physical resources, in response to determining that sufficient physical capacity is available to host the calculated equivalent capacity,
    wherein an acceptable risk level (ARL) with respect to SLA non-compliance due to congestion for a service provider is defined by a policy engine such that if the available physical capacity is greater than the equivalent capacity and feasible placement of virtual resources belonging to the VRSs exists for an equivalent capacity for resource ranges defined for a usage windows, then availability SLAs of VRSs are protected at with probability=1−ARL, where ARL is the acceptable risk level probability.

15. The method of claim 14, wherein a rejection handling policy is enforced, in response to determining that the available physical capacity is insufficient to host the calculated equivalent capacity.

16. The method of claim 14, wherein a requested service by the service subscriber is admitted, in response to determining that sufficient physical capacity is available to host the calculated equivalent capacity.

17. The method of claim 14 further comprising periodically calculating expected equivalent capacity for different time frames based on data that suggests use trends and other relevant information collected and stored in the operational database and the SLA repository.

18. The method of claim 14, further comprising notifying that additional physical capacity is needed to cover the calculated equivalent capacity, in response to determining that the physical capacity is insufficient to host the calculated equivalent capacity.

\* \* \* \* \*